United States Patent
Chiu (10) Patent No.: US 10,310,092 B2
(45) Date of Patent: Jun. 4, 2019

(54) SATELLITE SIGNAL RECEIVING APPARATUS AND ANTENNA PATTERN ADJUSTING METHOD THEREOF

(71) Applicant: Getac Technology Corporation, Hsinchu County (TW)

(72) Inventor: Shang Ming Chiu, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 378 days.

(21) Appl. No.: 15/139,485

(22) Filed: Apr. 27, 2016

(65) Prior Publication Data

US 2017/0315239 A1    Nov. 2, 2017

(51) Int. Cl.
  *G01S 19/23*    (2010.01)
  *G01S 19/28*    (2010.01)
  *H01Q 3/44*    (2006.01)

(52) U.S. Cl.
  CPC .............. *G01S 19/23* (2013.01); *G01S 19/28* (2013.01); *H01Q 3/44* (2013.01); *H01Q 3/446* (2013.01)

(58) Field of Classification Search
  CPC .. G01S 19/23–235; H01Q 3/44; H01Q 3/446; H01Q 3/24; H01Q 19/32
  See application file for complete search history.

(56) References Cited

U.S. PATENT DOCUMENTS

| | | | |
|---|---|---|---|
| 8,130,145 B2* | 3/2012 | Simic | G01S 19/24 342/357.76 |
| 9,804,272 B2* | 10/2017 | Desclos | G01S 19/36 |
| 2010/0277367 A1* | 11/2010 | Dicke | G01S 19/24 342/357.74 |
| 2013/0210452 A1* | 8/2013 | Sung | H04W 24/00 455/456.1 |
| 2016/0195391 A1* | 7/2016 | Young | G01C 17/38 702/92 |

* cited by examiner

*Primary Examiner* — Cassi J Galt
(74) *Attorney, Agent, or Firm* — Locke Lord LLP; Tim Tingkang Xia, Esq.

(57) ABSTRACT

A satellite signal receiving apparatus and an antenna pattern adjusting method thereof are provided. A coupling relationship between a main antenna and a plurality of pattern adjustment antennas is adjusted to thereby adjust an angle of the antenna pattern so that the average intensity of satellite signals attributed to target satellites and received by an antenna array is higher than a first preset intensity.

11 Claims, 5 Drawing Sheets

SATELLITE SIGNAL RECEIVING APPARATUS AND ANTENNA PATTERN ADJUSTING METHOD THEREOF

BACKGROUND OF THE INVENTION

Field of the Invention

The present invention relates to antenna apparatuses and, more particularly, to a satellite signal receiving apparatus and an antenna pattern adjusting method thereof.

Description of the Prior Art

Due to technological advancements in satellites, technological applications based on the integration of satellites with communication techniques are increasingly commercially available. In this regard, navigation systems, such as global positioning systems (GPS) and global navigation satellite systems (GNSS), enable satellites to be integrated with wireless communication techniques to therefore provide precise information about users' positions and speed as well as time. For instance, a GPS not only precisely determines the time and route which a moving vehicle or a ship has to take in order to arrive at its destination but also enables ambulances to transport the sick or injured quickly and efficiently, whereas e-maps inform drivers of current locations and intended destinations.

However, the positions of satellites in operation vary with time. If the satellite signals are received according to an invariable pattern by antennas for use in receiving satellite signals, the pattern of the antennas will, at a specific point in time, no longer be most suitable for receiving the satellite signals, thereby deteriorating the signal reception quality of the antennas.

SUMMARY OF THE INVENTION

The present invention provides a satellite signal receiving apparatus and an antenna pattern adjusting method thereof to effectively ensure the signal reception quality of antennas for use with the satellite signal receiving apparatus.

The satellite signal receiving apparatus of the present invention comprises an antenna array and a control unit. The antenna array receives satellite signals from a plurality of satellites. The antenna array comprises a main antenna and at least a pattern adjustment antenna. The main antenna radiates an antenna pattern. The pattern adjustment antenna is coupled to the antenna pattern and adjusts the angle of the antenna pattern. The control unit is coupled to the at least a pattern adjustment antenna to calculate an average intensity of satellite signals of target satellites, determine whether the average intensity is lower than a first preset intensity, and adjust a coupling relationship between the main antenna and the at least a pattern adjustment antenna if the average intensity is lower than the first preset intensity, so as to adjust the angle of the antenna pattern so that the average intensity of satellite signals attributed to the target satellites and received by the antenna array is higher than the first preset intensity.

In an embodiment of the present invention, the control unit selects from the satellites a plurality of candidate satellites having satellite signal intensity higher than a threshold intensity and calculates an average angle of elevation of the candidate satellites.

In an embodiment of the present invention, the control unit calculates the average intensity of satellite signals of the satellites and adds the calculated average intensity of satellite signals of the satellites to a second preset intensity to obtain the threshold intensity.

In an embodiment of the present invention, the control unit determines whether the average angle of elevation is smaller than a threshold angle and, if the average angle of elevation is not smaller than the threshold angle, does not adjust the angle of the antenna pattern.

In an embodiment of the present invention, the threshold angle is 60 degrees.

In an embodiment of the present invention, if the average angle of elevation is smaller than the threshold angle, the control unit selects one of the candidate satellites, with the selected candidate satellite ranking $N^{th}$ by satellite signal intensity so that the satellite signal intensity of the selected candidate satellite is regarded as a standard intensity, and the control unit determines whether the standard intensity is higher than the threshold intensity so that, if the standard intensity is higher than the threshold intensity, the control unit selects some of the candidate satellites and regards the selected candidate satellites as the target satellites, with the selected candidate satellites ranking first through $N^{th}$ by satellite signal intensity, respectively, wherein N is a positive integer.

In an embodiment of the present invention, if the average intensity is not lower than the first preset intensity, the control unit stops adjusting the coupling relationship between the main antenna and the at least a pattern adjustment antenna and, after a predetermined period of time has passed, keeps calculating the average intensity of satellite signals of the satellites.

In an embodiment of the present invention, the control unit determines whether the average intensity corresponding to each adjusted antenna pattern is lower than the first preset intensity, stops adjusting the coupling relationship between the main antenna and the at least a pattern adjustment antenna if the average intensity corresponding to each adjusted antenna pattern is lower than the first preset intensity, and keeps calculating the average intensity of satellite signals of the satellites after a predetermined period of time has passed.

In an embodiment of the present invention, the satellite signal receiving apparatus comprises a plurality of switches coupled between the at least a pattern adjustment antenna and a ground, respectively, so that the control unit controls ON states of the switches to adjust the coupling relationship between the main antenna and the at least a pattern adjustment antenna.

The antenna pattern adjusting method of the present invention comprises the steps of: calculating an average intensity of satellite signals of a plurality of target satellites; determining whether the average intensity is lower than a first preset intensity; and adjusting a coupling relationship between the main antenna and the at least a pattern adjustment antenna if the average intensity is lower than the first preset intensity, to thereby adjust an angle of the antenna pattern so that the average intensity of the satellite signals attributed to the target satellites and received by the antenna array is higher than the first preset intensity.

In an embodiment of the present invention, the antenna pattern adjusting method further comprises the steps of: selecting from a plurality of satellites a plurality of candidate satellites having satellite signal intensity higher than a threshold intensity; and calculating an average angle of elevation of the candidate satellites relative to a pattern of the antenna array.

In an embodiment of the present invention, the antenna pattern adjusting method further comprises the steps of: calculating the average intensity of satellite signals of the satellites; and adding the calculated average intensity of satellite signals of the satellites to a second preset intensity to obtain the threshold intensity.

In an embodiment of the present invention, the antenna pattern adjusting method further comprises the steps of: determining whether the average angle of elevation is smaller than a threshold angle; and not adjusting the angle of the antenna pattern if the average angle of elevation is not smaller than the threshold angle.

In an embodiment of the present invention, the threshold angle is 60 degrees.

In an embodiment of the present invention, the antenna pattern adjusting method further comprises the steps of: selecting one of the candidate satellites if the average angle of elevation is smaller than the threshold angle, wherein the selected candidate satellite ranks $N^{th}$ by satellite signal intensity so that the satellite signal intensity of the selected candidate satellite is regarded as a standard intensity; and determining whether the standard intensity is higher than the threshold intensity and selecting some of the candidate satellites and regarding the selected candidate satellites as the target satellites, wherein the selected candidate satellites rank first through $N^{th}$ by satellite signal intensity, respectively, if the standard intensity is higher than the threshold intensity, wherein N is a positive integer.

In an embodiment of the present invention, the antenna pattern adjusting method further comprises the steps of: stopping the adjustment of the coupling relationship between the main antenna and the at least a pattern adjustment antenna if the average intensity is not lower than the first preset intensity; determining whether a predetermined period of time has passed; and calculating the average intensity of satellite signals of the satellites continuously if a predetermined period of time has passed.

In an embodiment of the present invention, the antenna pattern adjusting method further comprises the steps of: determining whether the average intensity corresponding to each adjusted antenna pattern is lower than the first preset intensity; stopping the adjustment of the coupling relationship between the main antenna and the at least a pattern adjustment antenna if the average intensity corresponding to each adjusted antenna pattern is lower than the first preset intensity; determining whether a predetermined period of time has passed; and calculating the average intensity of satellite signals of the satellites continuously if a predetermined period of time has passed.

In an embodiment of the present invention, the step of adjusting the coupling relationship between the main antenna and the at least a pattern adjustment antenna entails controlling the coupling relationship between the at least a pattern adjustment antenna and a ground.

Therefore, according to embodiments of the present invention, a coupling relationship between a main antenna and a plurality of pattern adjustment antennas is adjusted to thereby adjust the angle of an antenna pattern so that the average intensity of satellite signals attributed to target satellites and received by an antenna array is higher than a first preset intensity, so as to effectively ensure the signal reception quality of an antenna for use with a satellite signal receiving apparatus.

To enable persons skilled in the art to fully understand the aforesaid features and advantages of the present invention, the present invention is illustrated with embodiments and the accompanying drawings and described below.

DETAILED DESCRIPTION OF THE EMBODIMENTS

Figure 1:
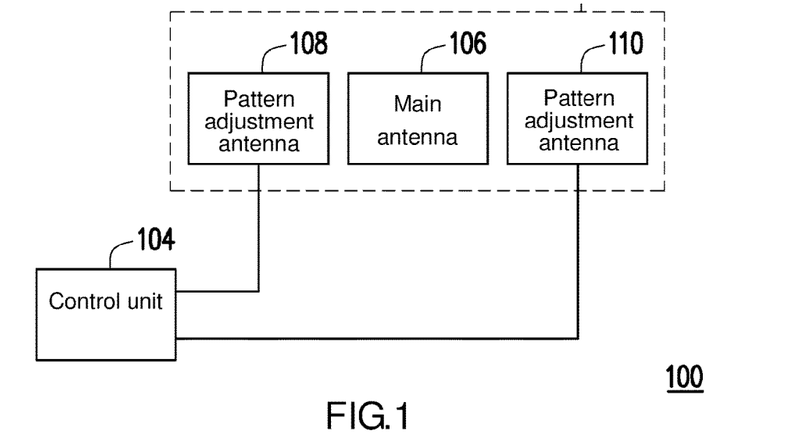
FIG. 1 is a schematic view of a satellite signal receiving apparatus according to an embodiment of the present invention.

FIG. 1 is a schematic view of a satellite signal receiving apparatus 100 according to an embodiment of the present invention. Referring to FIG. 1, the satellite signal receiving apparatus 100 comprises an antenna array 102 and a control unit 104. The antenna array 102 comprises a main antenna 106, pattern adjustment antenna 108 and pattern adjustment antenna 110. The pattern adjustment antenna 108 and the pattern adjustment antenna 110 are coupled to the control unit 104. The antenna array 102 receives satellite signals from a plurality of satellites. The main antenna 106 of the antenna array 102 radiates an antenna pattern. The pattern adjustment antenna 108 and the pattern adjustment antenna 110 adjust the angle of the antenna pattern radiated from the main antenna 106. The control unit 104 calculates the average intensity of the satellite signals of a plurality of target satellites and determines whether the average intensity of the satellite signals of the target satellites is lower than a first preset intensity (such as 42 dB, but the present invention is not limited thereto.) If the average intensity of the satellite signals of the target satellites is lower than the first preset intensity, the control unit 104 will adjust a coupling relationship between the main antenna 106 and the pattern adjustment antennas 108, 110 to adjust the angle of the antenna pattern of the main antenna 106 so that the average intensity of the satellite signals attributed to the target satellites and received by the antenna array 102 is higher than the first preset intensity, so as to ensure the signal reception quality of the antenna array 102 of the satellite signal receiving apparatus 100.

Figure 2:
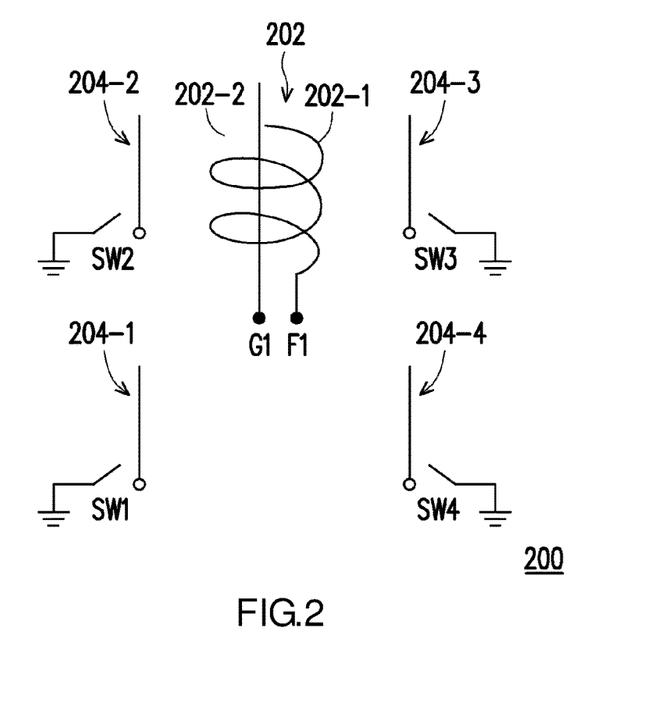
FIG. 2 is a schematic view of an antenna array according to an embodiment of the present invention.

The embodiment depicted by FIG. 1 is not restrictive of the quantity of the pattern adjustment antennas of the antenna array. In another embodiment, the quantity of the pattern adjustment antennas is subject to change as needed. For example, FIG. 2 is a schematic view of an antenna array 200 according to an embodiment of the present invention. In this embodiment, the antenna array 200 comprises four pattern adjustment antennas 204-1, 204-2, 204-3, 204-4. The pattern adjustment antennas 204-1, 204-2, 204-3, 204-4 each have one end coupled to a ground through switches SW1, SW2, SW3, SW4, respectively. The pattern adjustment antennas 204-1, 204-2, 204-3, 204-4 each have the other end adapted to be an open-circuit end. A main antenna 202 of the antenna array 200 comprises a helix antenna 202-1 and a central ground wire 202-2. The central ground wire 202-2 is linear, with one end thereof having a ground point G1 and the other end thereof being an open-circuit end. The helix antenna 202-1 has one end having a feed point F1 and the other end being an open-circuit end. The helix antenna 202-1 extends along the central ground wire 202-2 from the ground point G1 of the central ground wire 202-2 to the open-circuit end of the central ground wire 202-2 to surround the central ground wire 202-2 so that the open-circuit end of the helix antenna 202-1 is positioned proximate to the open-circuit end of the central ground wire 202-2. The control unit 104 is coupled to the pattern adjustment antennas 204-1, 204-2, 204-3, 204-4 through switches SW1, SW2, SW3, SW4, respectively. The control unit 104 controls the ON states of switches SW1, SW2, SW3, SW4 to adjust the coupling relationship between the main antenna 202 and the pattern adjustment antennas 204-1, 204-2, 204-3, 204-4. For example, the control unit 104 turns on switch SW4 and turns off switches SW1, SW2, SW3 so that the antenna pattern of the main antenna 202 goes in the direction of the pattern adjustment antenna 204-4.

The main antenna 202 and the pattern adjustment antennas 204-1, 204-2, 204-3, 204-4 are described in this embodiment for exemplary sake only. Therefore, the implementation of the main antenna 202 and the pattern adjustment antennas 204-1, 204-2, 204-3, 204-4 is not restricted to this embodiment.

In addition, the target satellites are selected in a manner described below. The control unit 106 compares the intensity of satellite signals of satellites with a threshold intensity and then selects from the satellites a plurality of candidate satellites having satellite signal intensity higher than the threshold intensity. The threshold intensity is the sum of the average intensity attributed to the satellite signals of all the satellites and calculated by the control unit 106 and a second preset intensity, wherein the second preset intensity is, for example, 0.5 dB, but the present invention is not limited thereto, nor is the way of configuring the threshold intensity limited by the present invention. Furthermore, the control unit 106 calculates the average azimuth angle and the average angle of elevation of the candidate satellites. The average azimuth angle and the average angle of elevation are for use in estimating the adjusted angle of the antenna pattern. The average angle of elevation is also for use in determining whether to adjust the pattern of the antenna array. For instance, the control unit 106 determines whether the average angle of elevation is smaller than a threshold angle, so as to not adjust the angle of the antenna pattern if the average angle of elevation is not smaller than the threshold angle, or adjust the angle of the antenna pattern if the average angle of elevation is smaller than the threshold angle.

Figure 3:
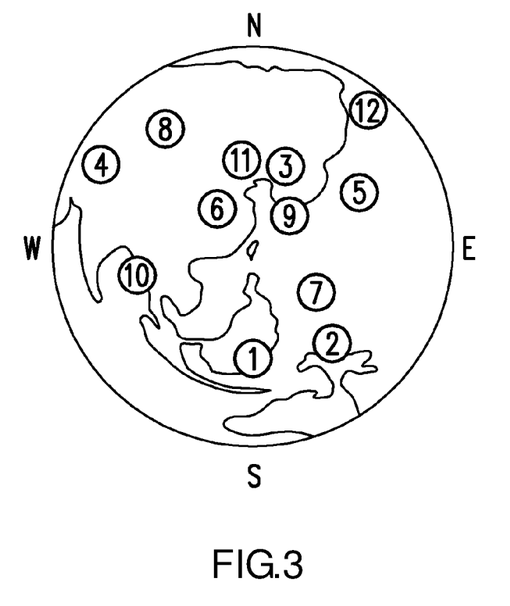
FIG. 3 is a schematic view of the distribution of satellites according to an embodiment of the present invention.

FIG. 3 is a schematic view of the distribution of satellites according to an embodiment of the present invention. In this embodiment, the antenna array for receiving the satellite signals is centrally located and can receive the satellite signals from satellite 1 to satellite 12. As shown in FIG. 3, the closer the satellite is to the center, the larger the angle of elevation corresponding to the satellite is. For example, the angle of elevation corresponding to satellite 6 is larger than the angle of elevation corresponding to satellite 4, and the angle of elevation corresponding to the satellite located at the center is 90 degrees. E, N, W, S denote different azimuths, i.e., East, North, West and South, respectively. The control unit 106 calculates the average intensity of the satellite signals of satellites 1~12 and then adds the calculated average intensity to the second preset intensity to obtain the threshold intensity. For example, in the embodiment depicted by FIG. 3, the intensity of satellites signals received by the satellite signal receiving apparatus 100 is shown in Table 1 below.

TABLE 1

| satellite ID Number | angle of elevation (degree) | azimuth angle (degree) | satellite signal intensity (dB) |
|---|---|---|---|
| satellite 1 | 18 | 50 | 180 | 32 |
| satellite 2 | 193 | 49 | 210 | 36 |
| satellite 3 | 42 | 65 | 340 | 39 |
| satellite 4 | 10 | 50 | 100 | 28 |
| satellite 5 | 24 | 50 | 300 | 35 |
| satellite 6 | 12 | 80 | 335 | 44 |
| satellite 7 | 25 | 65 | 220 | 40 |
| satellite 8 | 21 | 25 | 40 | 30 |
| satellite 9 | 14 | 85 | 280 | 37 |
| satellite 10 | 20 | 50 | 100 | 38 |
| satellite 11 | 15 | 60 | 10 | 41 |
| satellite 12 | 22 | 10 | 282 | 29 |

Figure 4:
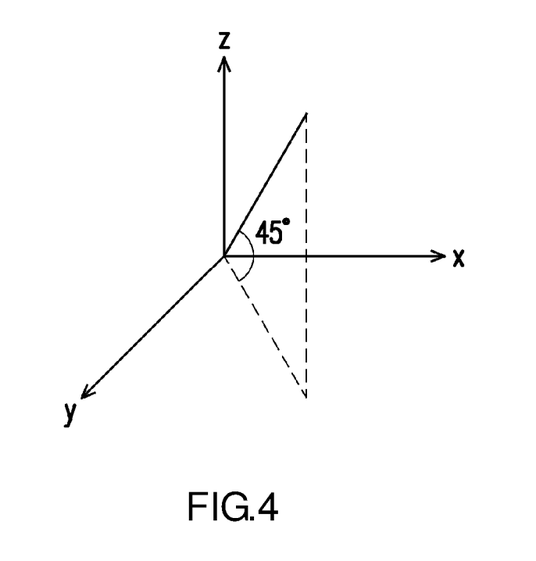
FIG. 4 is a schematic view of the average angle of elevation of candidate satellites according to an embodiment of the present invention.

The angle of elevation is observed by an user (located at the center) facing the satellite. The azimuth angle is calculated with reference to the North. For example, a satellite at the North has an azimuth angle of 0 degree. The control unit 106 compares the intensity of satellite signals of satellites with a threshold intensity (such as 36 dB, but the present invention is not limited thereto) and then selects from satellites 1~12 a plurality of candidate satellites, such as satellites 3, 6, 7, 9, 10, 11, having satellite signal intensity higher than the threshold intensity. The control unit 106 calculates the average azimuth angle and the average angle of elevation of the candidate satellites (satellites 3, 6, 7, 9, 10, 11) and determines whether to adjust the pattern of the antenna array. FIG. 4 is a schematic view of the average angle of elevation of the candidate satellites according to an embodiment of the present invention. Referring to FIG. 4, the antenna array 102 rests on the xy plane, and Z-axis is the normal of the xy plane. In the embodiment depicted by FIG. 3, the average angle of elevation of each candidate satellite is 45 degrees; that is, the average included angle between each candidate satellite and the xy plane is 45 degrees (or the complementary angle of the included angle between each candidate satellite and Z-axis is 45 degrees), and the threshold angle is presumably 60 degrees. With the average angle of elevation being smaller than the threshold angle, the control unit 106 has to adjust the angle of the antenna pattern.

The angle of the antenna pattern is adjusted in a manner described below. The control unit 106 selects one of the candidate satellites, wherein the selected candidate satellite ranks $N^{th}$ by satellite signal intensity so that the satellite signal intensity of the selected candidate satellite is regarded as the standard intensity, where N is a positive integer. The control unit 106 determines whether the standard intensity is higher than the threshold intensity. If the control unit 106 determines that the standard intensity is higher than the threshold intensity, the control unit 106 selects some of the candidate satellites and regarding the selected candidate satellites as the target satellites, wherein the selected candidate satellites rank first through $N^{th}$ by satellite signal intensity, respectively (i.e., selecting the top N satellites with the highest satellite signal intensity and regarding them as target satellites.) For example, referring to FIG. 3, if satellites 6, 7, 10, 11 are the top four satellites with the highest satellite signal intensity (i.e., assuming that N=4, but the present invention is not limited thereto), satellites 6, 7, 10, 11 will be regarded as target satellites. Conversely, if the standard intensity is not higher than the threshold intensity, it means that there are few satellites with high satellite signal intensity, and, as a result, regarding the top N satellites with the highest satellite signal intensity as target satellites is not effective in improving the signal reception quality of the antenna efficiently. Therefore, the control unit 106 calculates the threshold intensity anew, selects new candidate satellites to ensure that there is a sufficiently large number of satellites with high satellite signal intensity, and regards the satellites as target satellites, so as to adjust the angle of the antenna pattern accordingly.

If the control unit 106 is already well informed of the antenna pattern angle corresponding to the coupling relationship between the main antenna and the pattern adjustment antenna, the control unit 106 will adjust the coupling relationship between the main antenna and the pattern adjustment antenna according to the average azimuth angle and the average angle of elevation which are already calculated, and in consequence the pattern of the antenna array will be adjusted to an angle corresponding to the average azimuth angle and the average angle of elevation. If the control unit 106 does not record the antenna pattern angle corresponding to the coupling relationship between the main antenna and the pattern adjustment antenna, the control unit 106 enables the coupling relationship between the main antenna and the pattern adjustment antenna to switch from one to one in turn so as to find the most appropriate antenna pattern angle and thereby attain the satisfactory satellite signal intensity. For example, in the embodiment depicted by FIG. 2, switch SW1~switch SW4 are turned on in turn so as to find the most appropriate antenna pattern angle. In the course of turning on switch SW1~switch SW4 in turn, if the control unit 106 determines that the average intensity of the satellite signals of target satellites is higher than the first preset intensity, the control unit will stop switching switch SW1~switch SW4; that is, stop adjusting the coupling relationship between the main antenna and the pattern adjustment antenna, so as to receive the satellite signals according to the current antenna pattern corresponding to the coupling relationship between the main antenna and the pattern adjustment antenna. In addition to taking turns turning on switch SW1~switch SW4, it is feasible to turn on switch SW1~switch SW4 in different combinations thereof in order to create different coupling relationships between the main antenna and the pattern adjustment antenna.

If the average intensity of the satellite signals of target satellites is not lower than the first preset intensity, it means that the current angle of the antenna pattern of the antenna array does not require any adjustment so that it is advisable to stop adjusting the coupling relationship between the main antenna and the pattern adjustment antenna, calculate the average intensity of the satellite signals of the satellites anew after a predetermined period of time has passed, and calculate the threshold intensity, so as to keep determining whether to adjust the angle of the antenna pattern, wherein the predetermined period of time is, for example, 300 seconds, but the present invention is not limited thereto. Furthermore, the control unit 106 determines whether the average intensity corresponding to each adjusted antenna pattern is lower than the first preset intensity. If the average intensity corresponding to each adjusted antenna pattern is lower than the first preset intensity, the control unit 106 will stop adjusting the coupling relationship between the main antenna and the pattern adjustment antenna, keep calculating the average intensity of the satellite signals of satellites after a predetermined period of time has passed, calculate the threshold intensity anew, and select new candidate satellites and target satellites, so as to adjust the angle of the antenna pattern. Hence, if it is impossible to adjust and attain the antenna pattern angle corresponding to the target satellites, the control unit 106 will be prevented from adjusting the angle of the antenna pattern continuously and thus incurring calculation-related costs. Therefore, instances of unnecessary adjustment-related attempts can be minimized by adjusting the angle of the antenna pattern only after the satellites have spent a predetermined period of time moving to different relative positions.

Figure 5:
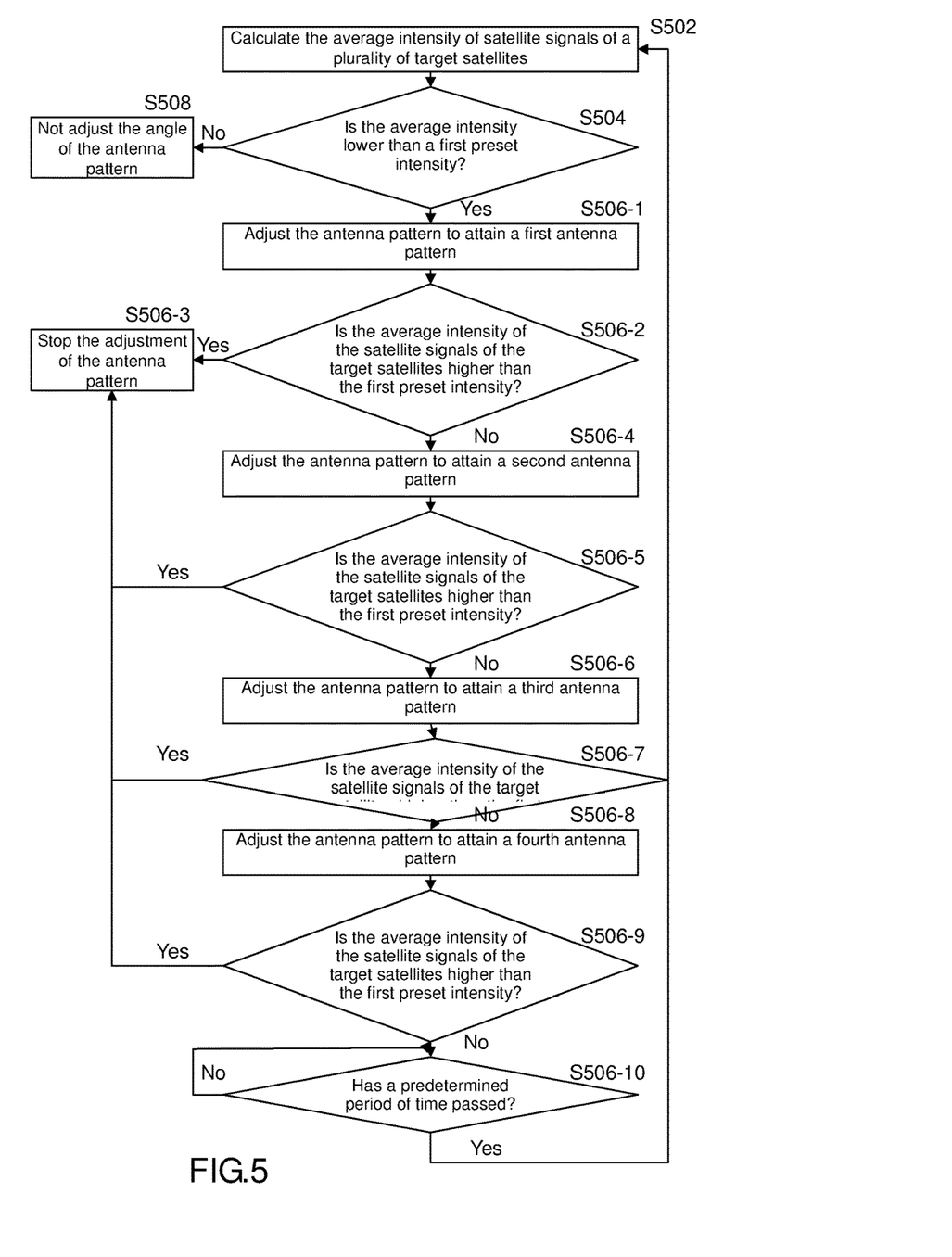
FIG. 5 is a schematic view of the process flow of an antenna pattern adjusting method according to an embodiment of the present invention.

FIG. 5 is a schematic view of the process flow of an antenna pattern adjusting method according to an embodiment of the present invention. Referring to FIG. 5, the antenna pattern adjusting method for use with the satellite signal receiving apparatus comprises the steps of: calculating the average intensity of the satellite signals of a plurality of target satellites (step S502); determining whether the average intensity is lower than a first preset intensity (step S504), wherein the first preset intensity is, for example, 42 dB, but the present invention is not limited thereto; adjusting the coupling relationship between the main antenna and the pattern adjustment antenna if the average intensity is lower than the first preset intensity, to thereby adjust the angle of the antenna pattern so that the average intensity of the satellite signals attributed to the target satellites and received by the antenna array is higher than the first preset intensity (step S506); and not adjusting the angle of the antenna pattern if the average intensity is not lower than the first preset intensity (step S508), wherein the coupling relationship between the main antenna and the pattern adjustment antenna is adjusted by, for example, controlling the coupling relationship between the pattern adjustment antenna and the ground.

For example, in the embodiment depicted by FIG. 2, step S506 entails turning on switch SW1 and turning off switches SW2, SW3, SW4, that is, coupling the pattern adjustment antenna 204-1 to the ground so that the antenna pattern is adjusted to attain a first antenna pattern (step S506-1), and determining whether the average intensity of the satellite signals of the target satellites is higher than the first preset intensity (step S506-2). If the average intensity of the satellite signals of the target satellites is higher than the first preset intensity, the adjustment of the antenna pattern will stop (step S506-3). By inference, if the average intensity of the satellite signals of the target satellites is not higher than the first preset intensity, switches SW2, SW3, SW4 will be turned on in turn, and the remaining switches will be turned off, that is, the pattern adjustment antenna 204-2 will be coupled to the ground in turn, and the antenna pattern will be adjusted to attain a second antenna pattern, third antenna pattern or fourth antenna pattern. Conversely, if the average intensity of the satellite signals of the target satellites is higher than the first preset intensity, the adjustment of the antenna pattern will stop, as shown in steps S506-4~S506-9. Upon determination in step S506-9 that the average intensity of the satellite signals of the target satellites is not higher than the first preset intensity; that is, the average intensity of the satellite signals of the target satellites corresponding to the adjusted antenna pattern is not higher than the first preset intensity, step S506-9 is followed by step S506-10 which entails determining whether a predetermined period of time has passed. If a predetermined period of time has not yet passed, the process flow of the antenna pattern adjusting method will go back to step S506-10. If a predetermined period of time has passed, the process flow of the antenna pattern adjusting method will go back to step S502 to calculate the average intensity of the satellite signals of target satellites anew. Hence, the control unit 106 will be prevented from adjusting the angle of the antenna pattern continuously. Therefore, instances of unnecessary adjustment-related attempts can be minimized by adjusting the angle of the antenna pattern only after the satellites have spent a predetermined period of time moving to different relative positions. The predetermined period of time is, for example, 300 seconds, but the present invention is not limited thereto. Furthermore, if step S506-3 does not occur eventually, step S506-10 will occur and entail determining whether a predetermined period of time has passed, and the process flow of the antenna pattern adjusting method will go back to step S502.

Figure 6A:
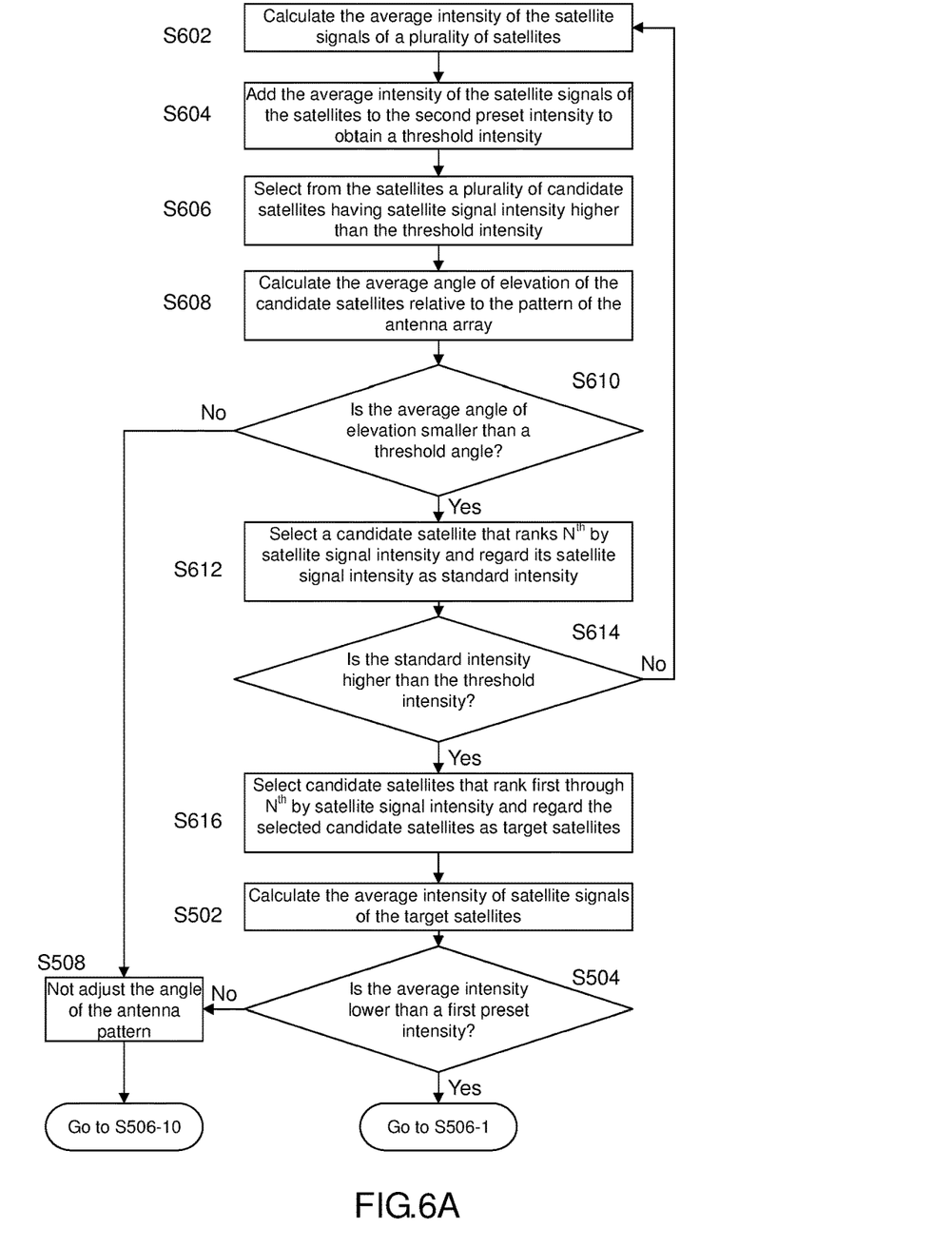
FIG. 6A and FIG. 6B are schematic views of the process flow of the antenna pattern adjusting method according to another embodiment of the present invention.
Figure 6B:
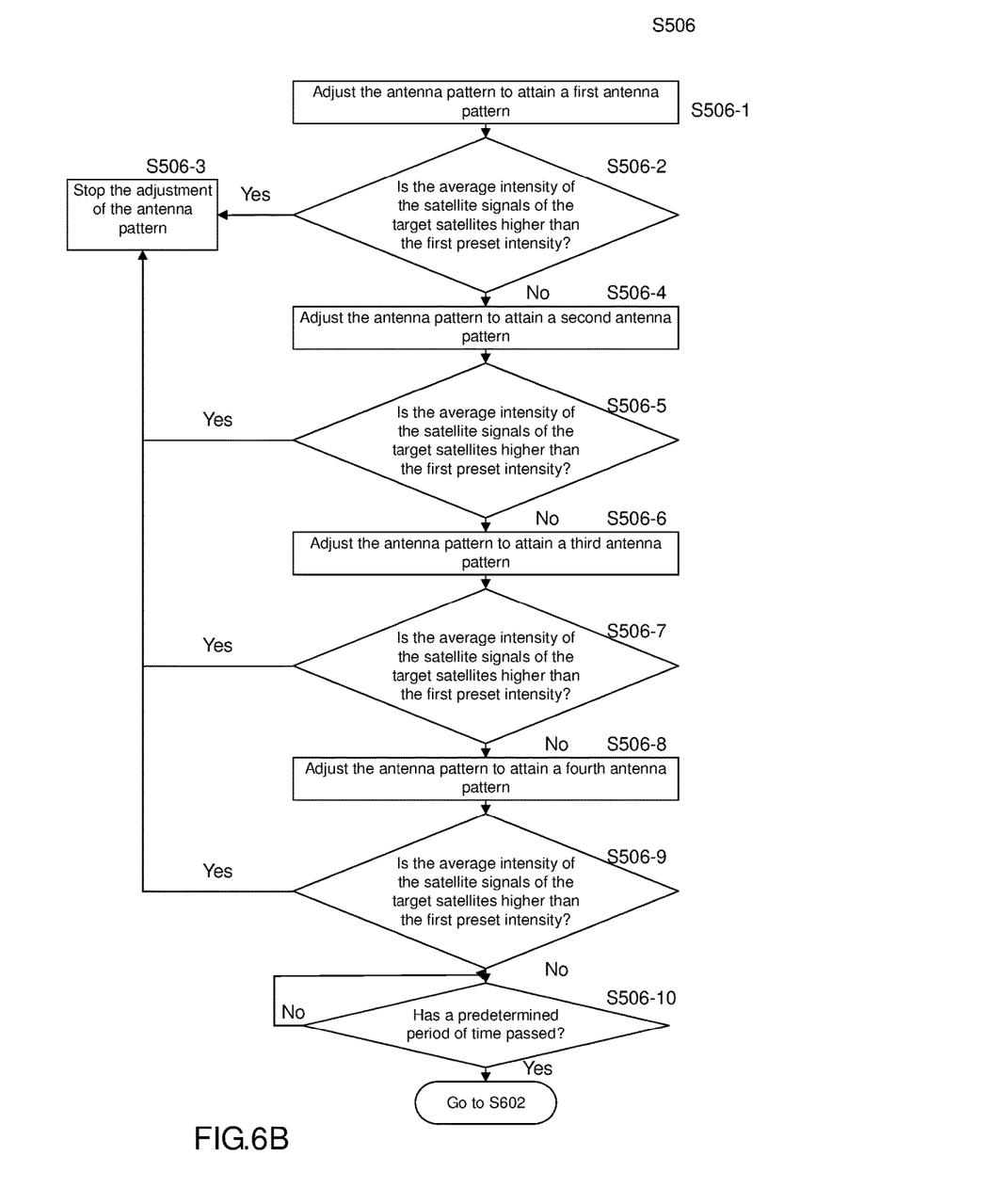

FIG. 6A and FIG. 6B are schematic views of the process flow of the antenna pattern adjusting method according to another embodiment of the present invention. Referring to FIG. 6A and FIG. 6B, unlike the embodiment depicted by FIG. 5, the embodiment depicted by FIG. 6A and FIG. 6B requires that the antenna pattern adjusting method for use with the satellite signal receiving apparatus entail selecting target satellites and include: calculating the average intensity of the satellite signals of a plurality of satellites (step S602); adding the average intensity of the satellite signals of the satellites to the second preset intensity to obtain a threshold intensity (step S604), wherein the second preset intensity is, for example, 0.5 dB, but the present invention is not limited thereto; selecting from the satellites a plurality of candidate satellites having satellite signal intensity higher than the threshold intensity (step S606); calculating the average angle of elevation and azimuth angle of the candidate satellites relative to the pattern of the antenna array (step S608); determining whether the average angle of elevation is smaller than a threshold angle (step S610), wherein the threshold angle is, for example, 60 degrees, but the present invention is not limited thereto, because, in a variant embodiment, the threshold angle varies with the way of implementing the antenna array; not adjusting the angle of the antenna pattern if the average angle of elevation is not smaller than the threshold angle (step S508); selecting one of the candidate satellites, wherein the selected candidate satellite ranks $N^{th}$ by satellite signal intensity so that the satellite signal intensity of the selected candidate satellite is regarded as the standard intensity if the average angle of elevation is smaller than the threshold angle (step S612); determining whether the standard intensity is higher than the threshold intensity (step S614); selecting some of the candidate satellites and regarding the selected candidate satellites as target satellites, wherein the selected candidate satellites rank first through $N^{th}$ by satellite signal intensity, respectively (step S616) (i.e., selecting the top N satellites with the highest satellite signal intensity and regarding them as target satellites if the standard intensity is higher than the threshold intensity, wherein N is, for example, 4, but the present invention is not limited thereto); and calculating the average intensity of satellite signals of a plurality of target satellites 420 (step S502). Subsequent steps are described in the embodiment depicted by FIG. 5 and thus are not reiterated hereunder. Conversely, if the standard intensity is not higher than the threshold intensity, it means that there are few satellites with high satellite signal intensity, and, as a result, regarding the top N satellites with the highest satellite signal intensity as target satellites and then adjusting the angle of the antenna pattern accordingly is not effective in achieving an ideal adjusted angle of the antenna pattern accurately and improving the signal reception quality of the antenna efficiently. Therefore, if the standard intensity is not higher than the threshold intensity, the process flow of the antenna pattern adjusting method will go back to step S602 in order to calculate the threshold intensity anew, select new target satellites, and adjust the angle of the antenna pattern accordingly.

In this embodiment, upon determination that the average intensity of the satellite signals of target satellites is not lower than the first preset intensity or upon determination that the average intensity of the satellite signals of target satellites, which each adjusted antenna pattern corresponds to, is lower than the first preset intensity, the adjustment of the coupling relationship between the main antenna and the pattern adjustment antenna stops, and the process flow of the antenna pattern adjusting method goes to step S506-10 to determine whether a predetermined period of time has passed. In this embodiment, if a predetermined period of time has passed, the process flow of the antenna pattern adjusting method will go back to step S602 to calculate the threshold intensity anew, select new target satellites, and adjust the angle of the antenna pattern accordingly. Hence, the control unit 106 is prevented from adjusting the angle of the antenna pattern continuously and thus incurring calculation-related costs. Therefore, instances of unnecessary adjustment-related attempts can be minimized by adjusting the angle of the antenna pattern only after the satellites have spent a predetermined period of time moving to different relative positions. The predetermined period of time is, for example, 300 seconds, but the present invention is not limited thereto.

In conclusion, according to embodiments of the present invention, a coupling relationship between a main antenna and a plurality of pattern adjustment antennas is adjusted to thereby adjust the angle of an antenna pattern so that the average intensity of satellite signals attributed to target satellites and received by an antenna array is higher than a first preset intensity, so as to effectively ensure the signal reception quality of an antenna for use with a satellite signal receiving apparatus.

Although the present invention is disclosed above by embodiments, the embodiments are not restrictive of the present invention. Any persons skilled in the art can make some changes and modifications to the embodiments without departing from the spirit and scope of the present invention. Accordingly, the legal protection for the present invention should be defined by the appended claims.

What is claimed is:

1. A satellite signal receiving apparatus, comprising:
    an antenna array for receiving satellite signals from a plurality of satellites, the plurality of satellites comprising a plurality of target satellites, and the antenna array comprising:
        a main antenna for radiating an antenna pattern;
        at least one pattern adjustment antenna for being coupled with the antenna pattern to adjust an angle of the antenna pattern;
    a control unit coupled to the main antenna and the at least one pattern adjustment antenna to calculate an average intensity of the satellite signals of the plurality of target satellites, determine whether the average intensity is lower than a first preset intensity, and adjust a coupling relationship between the main antenna and the at least one pattern adjustment antenna if the average intensity is lower than the first preset intensity, so as to adjust the angle of the antenna pattern so that the average intensity of satellite signals of the target satellites received by the antenna array is higher than the first preset intensity; and a plurality of switches coupled between the at least one pattern adjustment antenna and a ground, respectively, so that the control unit controls ON states of the switches to adjust the coupling relationship between the main antenna and the at least one pattern adjustment antenna;

wherein the control unit selects from the plurality of satellites a plurality of candidate satellites having satellite signal intensity higher than a threshold intensity and calculates an average angle of elevation of the candidate satellites;

wherein the control unit calculates the average intensity of satellite signals of the plurality of satellites and adds the calculated average intensity of satellite signals of the plurality of satellites to a second preset intensity to obtain the threshold intensity; and wherein the control unit determines whether the average angle of elevation is smaller than a threshold angle and, if the average angle of elevation is not smaller than the threshold angle, does not adjust the angle of the antenna pattern.

2. The satellite signal receiving apparatus of claim 1, wherein the threshold angle is 60 degrees.

3. The satellite signal receiving apparatus of claim 1, wherein, if the average angle of elevation is smaller than the threshold angle, the control unit selects one of the plurality of candidate satellites, with the selected candidate satellite ranking $N^{th}$ by satellite signal intensity so that the satellite signal intensity of the selected candidate satellite is regarded as a standard intensity, and the control unit determines whether the standard intensity is higher than the threshold intensity so that, if the standard intensity is higher than the threshold intensity, the control unit selects some of the plurality of candidate satellites and regards the selected candidate satellites as the target satellites, with the selected candidate satellites ranking first through $N^{th}$ by satellite signal intensity, respectively, wherein N is a positive integer.

4. The satellite signal receiving apparatus of claim 1, wherein, if the average intensity is not lower than the first preset intensity, the control unit stops adjusting the coupling relationship between the main antenna and the at least one pattern adjustment antenna and, after a predetermined period of time has passed, calculates anew the average intensity of satellite signals of the plurality of satellites so as to keep determining whether to adjust the angle of the antenna pattern.

5. The satellite signal receiving apparatus of claim 1, wherein the control unit tests each available antenna pattern and determines whether the average intensity corresponding to each adjusted antenna pattern is lower than the first preset intensity, stops adjusting the coupling relationship between the main antenna and the at least one pattern adjustment antenna if the average intensity corresponding to each adjusted antenna pattern is lower than the first preset intensity, and calculates anew the average intensity of satellite signals of the plurality of target satellites after a predetermined period of time has passed so as to keep determining whether to adjust the angle of the antenna pattern.

6. An antenna pattern adjusting method, comprising the steps of:

calculating, by a control unit, wherein the control unit is part of a satellite signal receiving apparatus comprising an antenna array and the control unit, an average intensity of satellite signals of a plurality of target satellites received at the antenna array, the antenna array comprising a main antenna and at least one pattern adjustment antenna and the control unit being coupled to the main antenna and the at least one pattern adjustment antenna;

determining, by the control unit, whether the average intensity is lower than a first preset intensity;

adjusting, by the control unit, a coupling relationship between the main antenna and the at least one pattern adjustment antenna if the average intensity is lower than the first preset intensity, to thereby adjust an angle of the antenna pattern so that the average intensity of the satellite signals of the target satellites received by the antenna array is higher than the first preset intensity;

selecting, by the control unit, a plurality of candidate satellites having satellite signal intensity higher than a threshold intensity from a plurality of satellites;

calculating, by the control unit, an average angle of elevation of the plurality of candidate satellites relative to a pattern of the antenna array;

calculating, by the control unit, the average intensity of satellite signals of the plurality of satellites;

adding, by the control unit, the calculated average intensity of satellite signals of the plurality of satellites to a second preset intensity to obtain the threshold intensity;

determining, by the control unit, whether the average angle of elevation is smaller than a threshold angle; and not adjusting the angle of the antenna pattern if the average angle of elevation is not smaller than the threshold angle.

7. The antenna pattern adjusting method of claim 6, wherein the threshold angle is 60 degrees.

8. The antenna pattern adjusting method of claim 6, further comprising the steps of:

selecting one of the plurality of candidate satellites if the average angle of elevation is smaller than the threshold angle, wherein the selected candidate satellite ranks $N^{th}$ by satellite signal intensity so that the satellite signal intensity of the selected candidate satellite is regarded as a standard intensity; and determining whether the standard intensity is higher than the threshold intensity and selecting some of the candidate satellites and regarding the selected candidate satellites as the target satellites, wherein the selected candidate satellites rank first through $N^{th}$ by satellite signal intensity, respectively, if the standard intensity is higher than the threshold intensity, wherein N is a positive integer.

9. The antenna pattern adjusting method of claim 6, further comprising the steps of:

stopping the adjustment of the coupling relationship between the main antenna and the at least one pattern adjustment antenna if the average intensity is not lower than the first preset intensity;

determining whether a predetermined period of time has passed; and calculating anew the average intensity of satellite signals of the satellites if a predetermined period of time has passed so as to keep determining whether to adjust the angle of the antenna pattern.

10. The antenna pattern adjusting method of claim 6, further comprising the steps of:

testing each available antenna pattern by the control unit;

determining whether the average intensity corresponding to each adjusted antenna pattern is lower than the first preset intensity;

stopping the adjustment of the coupling relationship between the main antenna and the at least one pattern adjustment antenna if the average intensity corresponding to each adjusted antenna pattern is lower than the first preset intensity;

determining whether a predetermined period of time has passed; and calculating anew the average intensity of satellite signals of the plurality of target satellites if the predetermined period of time has passed so as to keep determining whether to adjust the angle of the antenna pattern.

11. The antenna pattern adjusting method of claim 6, wherein the step of adjusting the coupling relationship between the main antenna and the at least one pattern adjustment antenna entails controlling the coupling relationship between the at least one pattern adjustment antenna and a ground.

* * * * *